United States Patent
Berr

(10) Patent No.: US 8,326,507 B2
(45) Date of Patent: Dec. 4, 2012

(54) METHOD FOR CHECKING THE FUNCTION OF A BRAKE SYSTEM WITH A BRAKE BOOSTER

(75) Inventor: Tobias Maria Berr, Stuttgart (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 476 days.

(21) Appl. No.: 12/708,037

(22) Filed: Feb. 18, 2010

(65) Prior Publication Data

US 2010/0222980 A1  Sep. 2, 2010

(30) Foreign Application Priority Data

Mar. 2, 2009 (DE) .................. 10 2009 011 280

(51) Int. Cl.
*B60T 17/22* (2006.01)
*G06F 17/00* (2006.01)
(52) U.S. Cl. ............... 701/77; 701/29.7; 303/114.1
(58) Field of Classification Search ............ 701/77, 701/29.1, 35, 29.7, 30.3, 30.8; 303/166, 303/122, 114.1
See application file for complete search history.

(56) References Cited

U.S. PATENT DOCUMENTS

| 5,435,635 | A | * | 7/1995 | Watanabe ............... 303/166 |
| 5,671,981 | A | | 9/1997 | Sasaki et al. |
| 6,276,763 | B1 | * | 8/2001 | Isono et al. ............ 303/114.1 |
| 7,484,815 | B2 | * | 2/2009 | Ogawa et al. ............ 303/122 |
| 2003/0004625 | A1 | | 1/2003 | Kachel et al. |

FOREIGN PATENT DOCUMENTS

| DE | 19935899 A1 | 2/2001 |
| DE | 10052257 A1 | 5/2002 |
| GB | 2352785 A | 2/2001 |
| JP | 8292112 A | 11/1996 |
| JP | 8295229 A | 11/1996 |
| JP | 2000168546 A | 6/2000 |
| JP | 2001322542 A | 11/2001 |
| JP | 2002249038 A | 9/2002 |

* cited by examiner

*Primary Examiner* — Tan Q Nguyen
(74) *Attorney, Agent, or Firm* — Leydig, Voit & Mayer, Ltd.

(57) ABSTRACT

A method is described which is used to check the correct function of the under-pressure brake system of a motor vehicle having an internal combustion engine and in particular of the output signals of a pressure sensor. The pressure sensor is arranged in the under-pressure region of the brake system.

14 Claims, 2 Drawing Sheets

METHOD FOR CHECKING THE FUNCTION OF A BRAKE SYSTEM WITH A BRAKE BOOSTER

CROSS-REFERENCE TO RELATED APPLICATION

This application claims the priority, under 35 U.S.C. §119, of German application DE 10 2009 011 280.4, filed Mar. 2, 2009; the prior application is herewith incorporated by reference in its entirety.

BACKGROUND OF THE INVENTION

Field of the Invention

Brake systems with a brake booster are standard in virtually all series-produced vehicles. Since the brake system, and alongside it the brake booster, are highly relevant for safety, continuous checking of the function of the brake system is highly significant for safe operation of the vehicle over the entire service life of the vehicle.

Especially in the case of vehicles whose internal combustion engine operate according to the diesel method, an under-pressure pump is often used which is driven indirectly or directly by the crankshaft of the internal combustion engine, in order to make available the under-pressure which is necessary for boosting the brakes.

SUMMARY OF THE INVENTION

It is accordingly an object of the invention to provide a method for checking the function of a brake system with a brake booster which overcome the above-mentioned disadvantages of the prior art methods and devices of this general type, which, in particular, detects malfunctions in the under-pressure system of the brake booster in a reliable and cost-effective way and as a result already detects in advance potential dangers to vehicle occupants owing to malfunctions of the brake system, and avoids such dangers.

The object is achieved according to the invention with a method for checking the function of a brake system of a vehicle with an internal combustion engine and a brake booster. Wherein the brake booster operates with under-pressure as auxiliary energy, and a pressure sensor is provided in the under-pressure region of the brake system. The brake pressure is sensed during a braking process of the vehicle. An output signal of the pressure sensor is stored in a memory before the start of the braking process if the brake pressure is within a predefined first pressure range. After an ending of the braking process, a difference is formed from a current output signal of the pressure sensor and the output signal which is stored in the memory. This difference is used to determine the correct function or possibly occurring malfunctions of the brake system, in particular of the under-pressure region.

The method according to the invention makes use of the effect that in an intact brake system there is a defined and reproducible relationship between the brake pressure during the braking operation and the subsequent change in the pressure in the under-pressure region of the brake booster. If a high brake pressure is built up, more auxiliary energy is required from the under-pressure accumulator of the brake booster and accordingly the pressure in the under-pressure accumulator increases after the release of the brake pedal or after the ending of the braking process. If the output signal of the pressure sensor is sensed before the start of a braking process and stored in a buffer and subsequently, after the ending of the braking process, a difference is formed from the now current output signal of the pressure sensor and the output signal stored in the buffer, it is possible to detect malfunctions of the under-pressure region, whether due to an incorrectly operating pump or to leaks in the under-pressure system. In this context, it is necessary to take into account the relationship between the brake pressure during the braking process and the change in pressure in the under-pressure region of the brake system before and after the braking operation. This can be carried out by utilizing the inventive method only if the brake pressure is within a predefined pressure range or by implementing a characteristic curve or a characteristic diagram which models the relationship specified above.

If, in fact, the difference $\Delta p$ between the two output signals of the pressure sensor beforehand and after the ending of the braking process is smaller than a predefined first threshold value, a fault is suspected. At the same time, in a further advantageous refinement of the method according to the invention, the value of a diagnostic counter can be increased in this case. In a corresponding way, the value of the diagnostic counter is reduced if the difference $\Delta p$ is greater than or equal to the first threshold value. This is then evaluated as proof of the fact that the brake system and, in particular, the under-pressure region of the brake system is satisfactory.

If the value of the diagnostic counter is greater than a predefined second threshold value, an entry is made in a fault memory and/or a fault signal is output. It is then necessary to take the vehicle to a workshop and to determine, and if appropriate eliminate, the cause of the occurrence of the fault signal.

In a further advantageous refinement of the invention there is provision that the method that is carried out only if the vehicle is within the predefined speed region at the start of the braking process. A further criterion for the method according to the invention to be capable of being implemented is that the braking process has not been carried out for a sufficiently long time before the start of the braking process since only then it is ensured that the under-pressure pump has built up a sufficient under-pressure in the pressure accumulator and as a result traceable and reproducible pressure conditions are present in the brake system.

In order to determine the tightness of the brake system, in particular of the under-pressure region of the brake system, before the method according to the invention is carried out, in a further advantageous refinement of the method according to the invention a time period $\Delta T$ is determined within which the pressure sensor outputs, after the start of the internal combustion engine, an output signal which corresponds to a pressure which is below a pressure limiting value DGW.

If this condition is met, this means that the under-pressure system is in all likelihood in a functional state since a prescribed under-pressure limiting value DGW has been undershot in a sufficiently short time after the starting of the internal combustion engine. If a malfunction of the under-pressure pump or a leak is present in the brake system, it is not possible to build up a sufficiently low brake under-pressure within the predefined time period $\Delta t$. As a result of a fault which is determined in this way, a fault message is output or a corresponding entry is made in a fault memory.

In a further advantageous refinement of the invention, a fault message is output by the control unit only when, during the determination of the time period $\Delta t$, no braking process has taken place. If a braking process does in fact take place during the determination of the time period $\Delta t$, there is a delay until the pressure limiting value is reached and in this respect upward transgression of the time period $\Delta t$ is not used as an indicator for a malfunction of the under-pressure pump or of the tightness of the under-pressure system.

As a further way of ensuring the method according to the invention there is provision that an output signal of the pressure sensor is checked to determine whether it is electrically satisfactory. Depending on whether the pressure sensor is connected to the control unit by means of a bus, in a particular a CAN bus or via a signal line, the output signal of the pressure sensor is checked in various ways which are known from the prior art.

The object mentioned at the beginning is also achieved by an open-loop and closed-loop control device and a computer program which operate according to the inventive method.

Other features which are considered as characteristic for the invention are set forth in the appended claims.

Although the invention is illustrated and described herein as embodied in a method for checking the function of a brake system with a brake booster, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
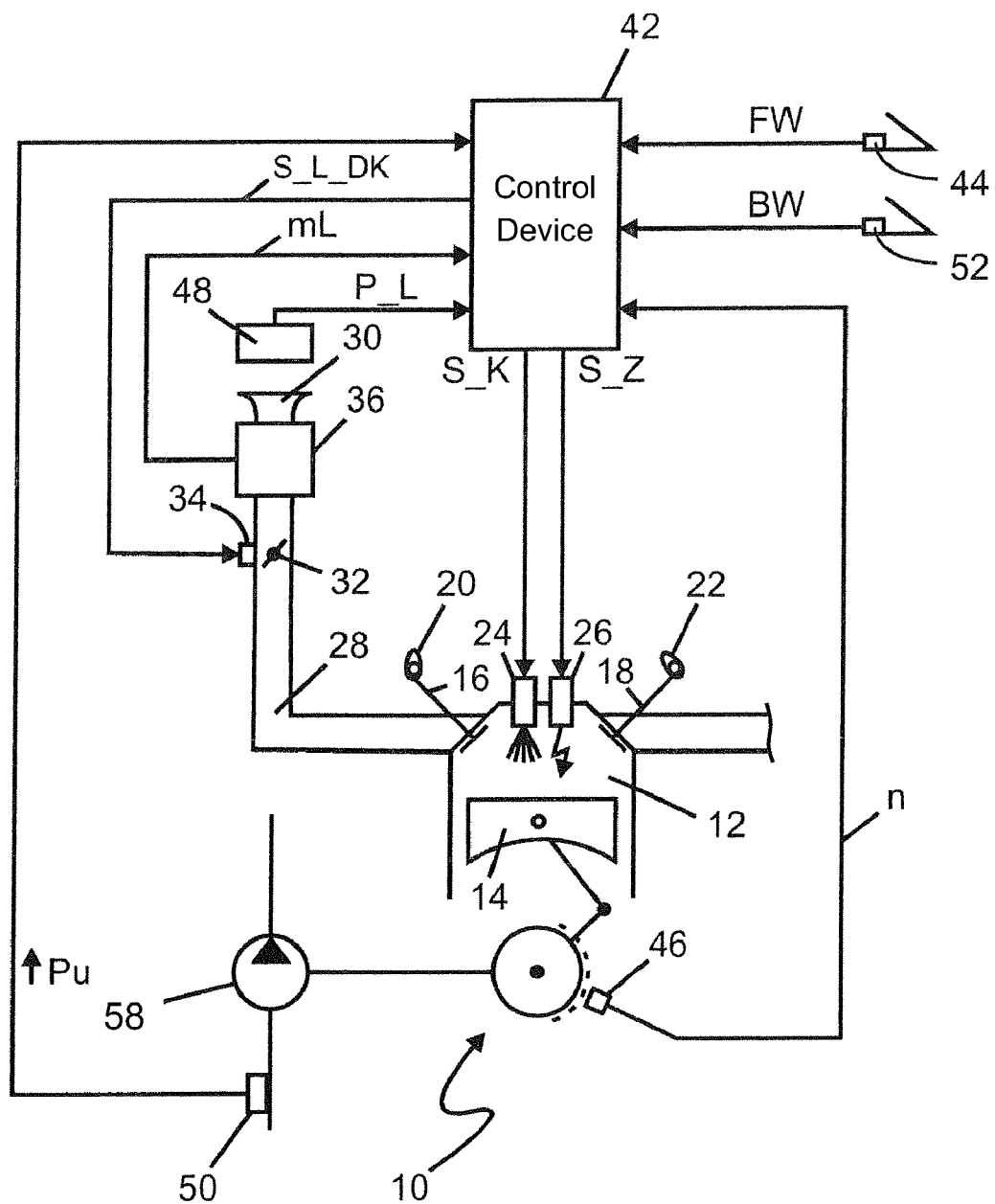
FIG. 1 is a schematic illustration of an internal combustion engine.

Referring now to the figures of the drawing in detail and first, particularly, to FIG. 1 thereof, there is shown a technical field of the invention. In particular, FIG. 1 shows an internal combustion engine 10 with a combustion chamber 12 which is sealed in a moveable fashion by a piston 14. The changing of the charges of the internal combustion engine 12 is controlled by at least one inlet valve 16 and one outlet valve 18 which are activated for this purpose by corresponding actuators 20, 22. In the refinement of FIG. 1, an injector 24 is used to meter a fuel into an air charge of the combustion chamber 22. The resulting mixture of fuel and air is ignited by a spark plug 26. The charging of the combustion chamber 12 with air is carried out from an intake manifold 28 with an intake connector 30. The intake manifold 28 has a throttle valve 32 which is activated by a throttle valve actuator 34, and an air mass flow rate meter 36.

The internal combustion engine 10 is controlled by an open-loop and closed-loop control device 42 (also referred to, for example, as "digital motor electronics (DME)") which for this purpose processes signals in which various operating parameters of the internal combustion engine 10 are represented. In the illustration in FIG. 1, especially the signal mL of the air mass flow rate meter 36, the signal FW of a driver's request signal generator 44 which senses a torque request of the driver, the signal n of a rotational speed signal generator 46 which senses a rotational speed n of a crankshaft of the internal combustion engine 40, and the signal P_L of a surroundings pressure sensor 48. The surroundings pressure sensor 48 is arranged in the region of the intake connector 30.

Of course, modern internal combustion engines 10 are equipped with a large number of further signal generators and/or sensors which are not illustrated here for reasons of clarity. Examples of such sensors are temperature sensors, further pressure sensors, exhaust gas sensors, etc. The enumeration of the signal generators 36, 44, 46 and 48 is not meant to be conclusive in this regard. However, it is not necessary for a separate sensor to be present for each operating parameter which is processed by the open-loop and closed-loop control device 42 because the open-loop and closed-loop control device 42 can model various operating parameters using computational models based on other, measured operating parameters.

The open-loop and closed-loop control device 42 forms, from the received signal transmitter signals, inter alia manipulated variables for setting the torque which is to be generated by the internal combustion engine 10. In the refinement in FIG. 1, these are, in particular, a manipulated variable S_K for actuating the injector 24, a manipulated variable S_Z for actuating the spark plug 26 and a manipulated variable S_L_DK for actuating the throttle valve actuator 34. Furthermore, the open-loop and closed-loop control device 42 is configured, in particular programmed, to carry out the method according to the invention or one of its refinements and/or control the corresponding method sequence.

The internal combustion engine 10 is, as is apparent from FIG. 1, coupled to an under-pressure pump 58 and drives it. The under-pressure pump 58 serves to make available the auxiliary energy which a brake booster requires in the form of an under-pressure. The rest of the brake system is not illustrated for reasons of clarity.

In the under-pressure region, that is to say on the intake side of the under-pressure pump 58, there is a pressure sensor 50 which serves to sense the under-pressure $p_u$ which is present in the under-pressure region. An output signal of the pressure sensor 50 is transmitted to the open-loop and closed-loop control device 42 via a signal line (without reference symbol) which can also be configured as a bus, in particular as a CAN bus. Furthermore, in addition to the driver's request signal generator 44, a brake pedal is present which is coupled to a braking request signal generator 52. The corresponding braking request BW is also transmitted to the open-loop and closed-loop control device 42 via a signal connection.

Figure 2:
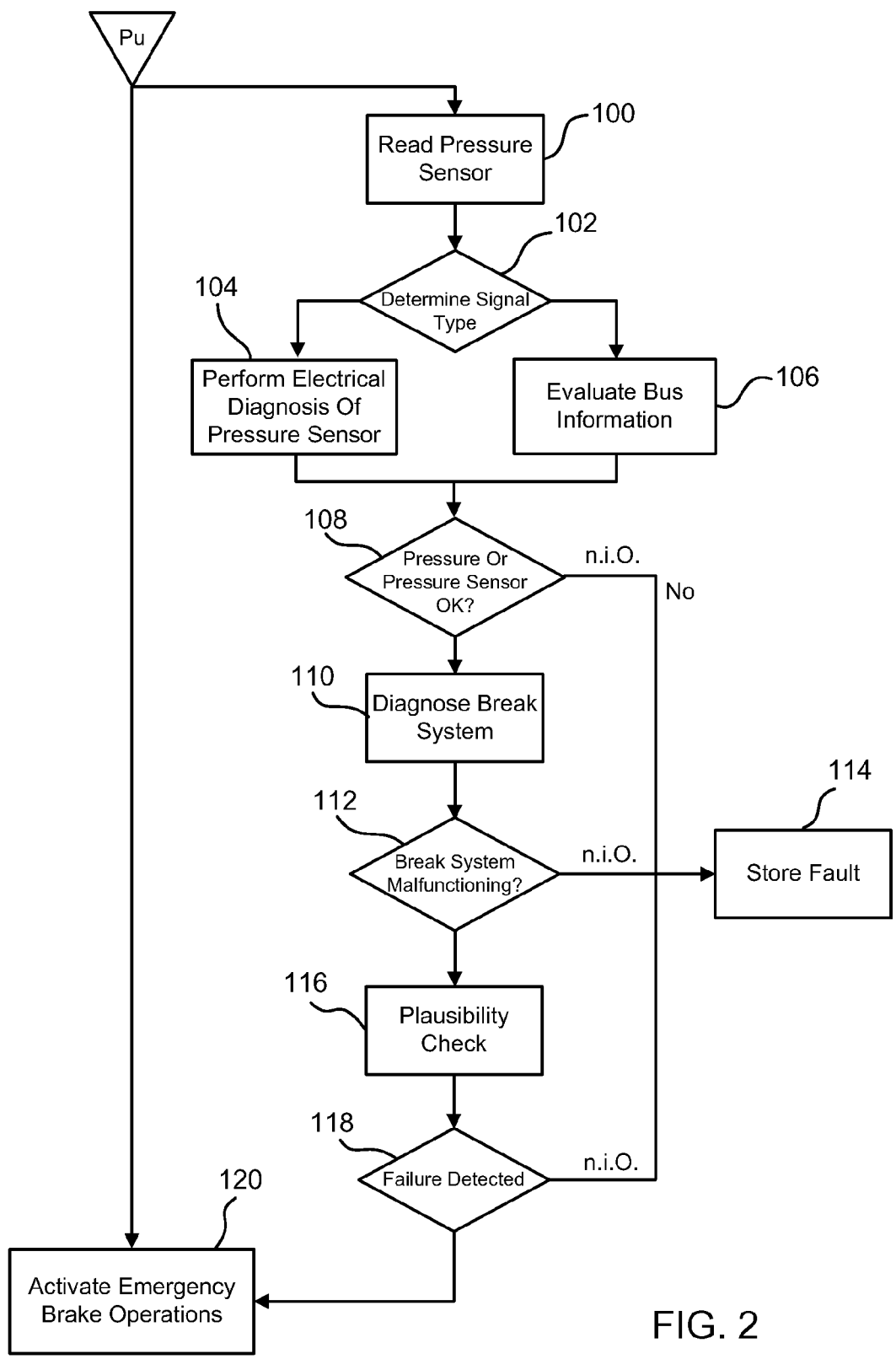
FIG. 2 is a flowchart illustrating a method according to the invention.

FIG. 2 illustrates a flowchart of the method according to the invention and will be described below. The starting point of the method is the under-pressure $p_u$ which is detected in the under-pressure region via the pressure sensor 50 and is used as an input variable for the method according to the invention.

In a first function block 100, the output signal of the pressure sensor 50 is read in. In accordance with the encoding of the sensor signal either as an analog output signal or as a bus signal, the method branches at a first branching point 102 either into a second function block 104 or a third function block 106. Electrical diagnostics of the pressure sensor 50 or of the output signal thereof are carried out in the second function block 104. In the third function block 106 the pressure sensor 50 is checked when the pressure sensor 50 is connected to the open-loop and closed-loop control device 42 via a data bus, in particular a CAN bus.

Downstream of the function blocks 104 and 106, the method is combined again at a second branching point 108. If the electrical diagnostics in the second function block 104 or the evaluation of the bus information in the third function block 106 have led to the result that the pressure sensor 50 or the output signal thereof is satisfactory, the method is continued in a fourth function block 108. If this leads to the result in the function blocks 104 and, respectively, 106 that the pressure sensor 50 or the output signal thereof is not satisfactory, the method jumps to a fourth branching block 118 and influences in a corresponding way the functions of the brake system which are processed in a seventh function block 120 and are based in a corresponding way on the output signal $p_u$ of the pressure sensor 50.

In another case, the method according to the invention branches from the second branching point 108 to a fourth function block 110. In the fourth function block 110, general diagnostics of the under-pressure brake system are performed. These general diagnostics can consist, for example, in determining a time period within which the pressure sensor 50 outputs, after the start of the internal combustion engine, an output signal $p_u$ which corresponds to a pressure which is below a pressure limiting value DGW. In this case, it is possible to assume that the under-pressure brake system is functioning correctly, since a requested minimum under-pressure is reached or undershot in a sufficiently short time after the start of the internal combustion engine. This is possible only if the under-pressure pump 58 is operating correctly and also otherwise no leaks occur in the underpressure brake system. Furthermore, it is, of course, possible to perform further tests of the under-pressure brake system.

Then, at a third branching point 112, it is decided whether or not a malfunction of the under-pressure brake system has been detected in the fourth function block 110. If malfunctions have been detected, the corresponding entry is made in a fault memory in a fifth function block 114 and/or a corresponding reaction to the fault entry occurs in the closed-loop and open-loop control device 42. It is therefore possible, for example, to switch on an emergency operation function and/or to make changes to the method of functioning of the open-loop and closed-loop control device.

However, if no fault has been diagnosed in the fourth function block 110 of the under-pressure brake system, the inventive plausibility checking of the output signals of the pressure sensor 50 is carried out in a sixth function block 116. This plausibility checking is carried out by virtue of the fact that the brake pressure is sensed during a braking process and whenever the brake pressure is within a predefined first pressure range, after the braking process has ended a difference is formed from a current output signal of the pressure sensor 50 and the output signal, stored in a memory, of the pressure sensor 50 before the braking process, in that the difference is compared with a predefined first threshold value, and in that a fault is suspected if the difference is smaller than a predefined first threshold value.

If such a fault is suspected, it is possible, in a further advantageous refinement of the method according to the invention, to increment a diagnostic counter, and after a predefined second threshold has been reached a corresponding entry is made in a fault memory. Additionally or alternatively it is also possible to output a fault signal.

Depending on the result of the various diagnostics in the function blocks 104, 106, 110 and 116 it is subsequently possible to evaluate or take into account, in the seventh function block, the output signal PU of the pressure sensor 50 in a correspondingly modified way. The method according to the invention therefore permits plausibility checking of the output signals $p_u$ of the pressure sensor 50, with the result that if the output signal $p_u$ is evaluated as being correct after the method according to the invention has been run through, all the functions of the brake system which are based on the under-pressure signal PU can be processed in the way provided.

However, if faults have been detected in the under-pressure brake system or the pressure sensor 50 owing to the inventive checking described above, these faults can be taken into account in a corresponding way in the seventh function block 120 by virtue of the fact that, for example, emergency operation functions of the closed-loop and open-loop control device 42 are activated or specific parameters are changed and/or changed algorithms are run through in order to ensure the best possible braking power and maximum safety of the vehicle despite the malfunctioning of the under-pressure brake system.

The invention claimed is:

1. A method for checking a functioning of a brake system of a vehicle with an internal combustion engine and a brake booster, the brake booster operating with under-pressure as auxiliary energy, and a pressure sensor disposed in an under-pressure region of the brake system, which comprises the steps of:
   sensing a brake pressure during a braking process of the vehicle;
   storing an output signal of the pressure sensor in a memory before a start of the braking process if the brake pressure is within a predefined first pressure range;
   after an ending of the braking process, forming a difference from a current output signal of the pressure sensor and the output signal stored in the memory; and
   evaluating the difference to determine a functioning of the brake system.

2. The method according to claim 1, which further comprises:
   comparing the difference with a predefined first threshold value; and
   suspecting a fault if the difference is smaller than the predefined first threshold value.

3. The method according to claim 2, which further comprises increasing a value of a diagnostic counter if at least one of a fault is suspected and the difference is smaller than the first threshold value.

4. The method according to claim 2, which further comprises reducing a value of a diagnostic counter if the difference is greater than or equal to the first threshold value.

5. The method according to claim 3, which further comprises performing at least one of:
   making an entry in a fault memory; and
   outputting a fault signal if the value of the diagnostic counter is greater than a predefined second threshold value.

6. The method according to claim 1, which further comprises carrying out the method only if the vehicle is within a predefined speed region at the start of the braking process.

7. The method according to claim 1, which further comprises carrying out the method only if more time than a predefined minimum period has passed between an end of a last preceding braking process and a start of a next braking process.

8. The method according to claim 1, which further comprises determining a time period within which the pressure sensor outputs, after a start of the internal combustion engine, the output signal which corresponds to a pressure which is below a pressure limiting value.

9. The method according to claim 8, which further comprises outputting a fault message if the time period is greater than a third threshold value.

10. The method according to claim 8, which further comprises outputting a fault message via a control unit only if a braking process has not taken place during a determination of the time period.

11. The method according to claim 1, which further comprises checking the output signal of the pressure sensor to determine whether it is electrically satisfactory.

12. The method according to claim 1, which further comprises evaluating the difference to determine a function of the under-pressure region.

13. An open-loop and/or closed-loop control device, comprising:
- a controller programmed to:
  - sense a brake pressure during a braking process of a vehicle;
  - store an output signal of a pressure sensor in a memory before a start of a braking process if the brake pressure is within a predefined first pressure range;
  - after an ending of the braking process, form a difference from a current output signal of the pressure sensor and the output signal stored in the memory; and
  - evaluate the difference to determine a functioning of a brake system.

14. A computer-readable medium having computer-executable instructions for performing a method which comprises the steps of:
- sensing a brake pressure during a braking process of a vehicle;
- storing an output signal of a pressure sensor in a memory before a start of a braking process if the brake pressure is within a predefined first pressure range;
- after an ending of the braking process, forming a difference from a current output signal of the pressure sensor and the output signal stored in the memory; and
- evaluating the difference to determine a functioning of a brake system.

* * * * *